United States Patent
Hill (10) Patent No.: US 8,899,433 B2
(45) Date of Patent: Dec. 2, 2014

(54) FLUID RESERVOIR AND METHOD OF MANUFACTURING A FLUID RESERVOIR

(71) Applicant: Mann+Hummel GmbH, Ludwigsburg (DE)

(72) Inventor: Colin Andrew Hill, Bridgend (GB)

(73) Assignee: Mann+Hummel GmbH, Ludwigsburg (DE)

( * ) Notice: Subject to any disclaimer, the term of this patent is extended or adjusted under 35 U.S.C. 154(b) by 40 days.

(21) Appl. No.: 13/726,174

(22) Filed: Dec. 23, 2012

(65) Prior Publication Data

US 2014/0103052 A1    Apr. 17, 2014

Related U.S. Application Data

(60) Provisional application No. 61/714,050, filed on Oct. 15, 2012.

(51) Int. Cl.
| | |
|---|---|
| *B65D 8/00* | (2006.01) |
| *B65D 8/02* | (2006.01) |
| *B60K 11/02* | (2006.01) |
| *B65D 25/22* | (2006.01) |
| *B67C 3/30* | (2006.01) |

(52) U.S. Cl.
CPC ............. *B60K 11/02* (2013.01); *B65D 11/08* (2013.01); *B65D 25/22* (2013.01); *B67C 3/30* (2013.01)
USPC .......................... 220/4.14; 220/4.12; 220/4.24

(58) Field of Classification Search
CPC .. B65D 77/068; B65D 90/025; B60H 3/2245; B60H 3/2265; B29C 2049/2021
USPC ............. 220/86.1, 694, 729, 4.12, 4.13, 4.24, 220/4.21
See application file for complete search history.

(56) References Cited

U.S. PATENT DOCUMENTS

| | | | | |
|---|---|---|---|---|
| 2,818,191 | A * | 12/1957 | Arne | 220/565 |
| 2,944,701 | A * | 7/1960 | Hatanaka | 220/86.1 |
| 4,527,709 | A * | 7/1985 | Kondo et al. | 220/501 |
| 4,739,730 | A * | 4/1988 | Jenz et al. | 123/41.54 |
| 5,456,218 | A * | 10/1995 | Theorell | 123/41.54 |
| 6,193,924 | B1 * | 2/2001 | Huse | 264/503 |
| 6,792,906 | B2 * | 9/2004 | Grant | 123/184.21 |
| 7,059,187 | B2 * | 6/2006 | Clarke et al. | 73/305 |
| 7,117,896 | B2 * | 10/2006 | Eberling et al. | 137/899 |
| 8,038,878 | B2 * | 10/2011 | Hewkin | 210/167.32 |
| 2006/0102626 | A1 * | 5/2006 | Mitsch et al. | 220/4.12 |
| 2009/0071955 | A1 | 3/2009 | Firth | |

FOREIGN PATENT DOCUMENTS

| | | |
|---|---|---|
| EP | 1533252 A2 | 5/2005 |
| GB | 2039980 A | 8/1980 |

* cited by examiner

*Primary Examiner* — Anthony Stashick
*Assistant Examiner* — Mollie Llewellyn
(74) *Attorney, Agent, or Firm* — James Hasselbeck (57) ABSTRACT

A fluid reservoir includes a housing defining a chamber for receiving a fluid. The housing may be generally rectangular with six orthogonally oriented sides. A plurality of mounting portions are carried by the housing. One or more fittings are selectively attached to respective mounting portions of the plurality of mounting portions. The mounting portions may include mounted surfaces at an intersection of a pair of adjacent sides of the housing. The mounting surfaces may be at angles to both of the respective adjacent sides.

18 Claims, 12 Drawing Sheets

FLUID RESERVOIR AND METHOD OF MANUFACTURING A FLUID RESERVOIR

CROSS REFERENCE TO RELATED APPLICATIONS

This application claims the benefit of U.S. Provisional Patent Application No. 61/714,050, filed Oct. 15, 2012 entitled "FLUID RESERVOIR AND METHOD OF MANUFACTURING A FLUID RESERVOIR" and which is hereby incorporated by reference in its entirety.

FIELD

The present disclosure generally relates to fluid reservoirs. More particularly, the present disclosure relates to a common fluid reservoir that may be used for various applications and in various orientations. The present disclosure also generally relates to a method of manufacturing fluid reservoirs and a kit for creating various fluid reservoirs with common components.

BACKGROUND

This section provides background information related to the present disclosure which is not necessarily prior art.

Operation of a motor vehicle requires the circulation of various fluids. For example, in a conventional motor vehicle coolant is used to both extract heat from the engine and direct heat to a heater core disposed in the passenger compartment. A pump circulates coolant heated by the engine from the engine to both the heater core and a radiator. Heat is extracted from the coolant by both the radiator and the heater core. The pump further circulates the cooled fluid from both the radiator and the heater core back to the engine for further cooling of the engine. When the coolant is hot, it expands. A radiator cap maintains the pressure in the radiator to a predetermined maximum amount. A coolant reservoir is conventionally provided to accommodate expansion of the coolant and a reserve of the coolant.

Fluid reservoirs conventionally include a filler neck and hose connections for the transfer of fluid into and out of a housing. The filler neck and hose connections are typically formed with the housing but may also be fixedly secured to the housing by welding. The filler neck and hose connections may be positioned on the housing and oriented relative to the housing for a reservoir layout dedicated for a particular use.

A common fluid reservoir may be used across various vehicle platforms. Such use may reduce tooling costs and provide other savings. The location and orientation of the fittings on a common fluid reservoir and the dimensions of a common fluid reservoir may limit underhood packaging flexibility for the vehicle. Conversely, where an underhood design requires a particular configuration, additional expense may be incurred for tooling, design and the like.

While known fluid reservoirs have proven to be generally acceptable for their intended uses, a continuous need for improvement remains within the relevant art.

SUMMARY

This section provides a general summary of the disclosure, and is not a comprehensive disclosure of its full scope or all of its features.

In accordance with one particular aspect, the present teachings provide a fluid reservoir including a housing defining a chamber for receiving a fluid. A plurality of mounting portions is carried by the housing. At least one fitting is selectively attached to a respective one of the mounting portions.

In accordance with another particular aspect, the present teachings provide a fluid reservoir including a generally rectangular housing having six orthogonally oriented sides. A plurality of mounting portions are carried by the generally rectangular housing. At least one of the mounting portions is disposed at an intersection of a pair of adjacent sides of the orthogonally oriented sides. At least one fitting is selectively attached to a respective one of the plurality of attachment portions.

In accordance with yet another particular aspect, the present teachings provide a method of constructing a fluid reservoir. The method includes providing a housing defining a chamber for receiving a fluid. The housing further defines a plurality of mounting portions. The method further includes selectively attaching at least one fitting to a respective one of the mounting portions.

In accordance with still yet another particular aspect, the present teachings provide a kit for constructing a fluid reservoir. The kit includes a plurality of housing elements. Each housing element cooperates with another housing element to define a generally rectangular housing including six orthogonally oriented sides. A plurality of mounting portions are carried by each housing element of the plurality of housing elements. At least one of the mounting portions is disposed at an intersection of a pair of adjacent sides of the orthogonally oriented sides when two of the housing elements are joined to define the generally rectangular housing. At least one fitting is selectively attached to a respective one of the plurality of mounting portions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings. It will be understood that the elements shown in the various views are drawn to scale.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1 through 5 of the drawings, a fluid reservoir constructed in accordance with the present teachings is generally shown and identified at reference character 10. In the embodiment illustrated, the fluid reservoir is a coolant reservoir 10. It will be understood, however, that the present teachings may be adapted for other types of fluid reservoirs.

While not illustrated, it will be understood that the fluid reservoir 10 may be in fluid communication with an engine and a radiator of a motor vehicle. The fluid reservoir 10 may also be in fluid communication with a heater core disposed in a passenger compartment of the motor vehicle for heating the passenger compartment. A pump may circulate fluid (e.g., coolant) heated by the engine from the engine to the radiator and the heater core. Heat is extracted by both the radiator and the heater core. The cooled fluid may be returned to the engine for further cooling of the engine.

The fluid reservoir 10 is illustrated to generally include a housing 12. As shown throughout the drawings, the housing 12 may be generally rectangular in shape. Explaining further, the housing 12 may include six generally orthogonally oriented sides. Within the scope of the present teachings, however, the housing 12 may be any suitable shape for a particular application.

The housing 12 may include one or more housing elements 14 and 16 that cooperate to define a cavity 18. In the embodiment illustrated, the housing 12 includes first and second housing elements 14 and 16. As illustrated, the first and second housing elements 14 and 16 may be upper and lower housing elements, respectively. It will become more apparent below, however, that the housing 12 may be alternatively oriented for particular applications. For example, the surface identified as an upper surface may be oriented such that the surface is a side surface.

The housing elements 14 and 16 may be constructed of polypropylene or any other suitable material. The housing elements 14 and 16 may be welded or otherwise securely fastened to each other. Each housing element 14 and 16 may include a respective peripheral flange 19. The flanges 19 may be welded together.

As shown throughout, FIGS. 1-5 of the drawings, the housing elements 14 and 16 may be identical to one another. As such, it may be possible to reduce associated tooling costs, design costs and inventories. Given the similarities between the housing elements 14 and 16, the housing element 14 may be described herein in more detail as compared to the housing element 16 but a complete understanding of the present teachings will be apparent therefrom.

Both housing elements 14 and 16 may define a plurality of sections 20. In the embodiment shown, the sections 20 create a design that generally resembles an egg carton. As illustrated, the housing elements 14 and 16 may include twelve (12) sections 20. In top view, the sections 20 may be arranged in rows and columns. In this exemplary embodiment, ten (10) of the sections 20 are located on a perimeter of the housing element 14 and the remaining two (2) sections 20 are circumscribed by the sections 20 on the perimeter. The sections 20 on the perimeter thus have a top and a sidewall. The top may generally transition to the respective sidewall gradually through an angled portion or through a curved segment.

Figure 6:
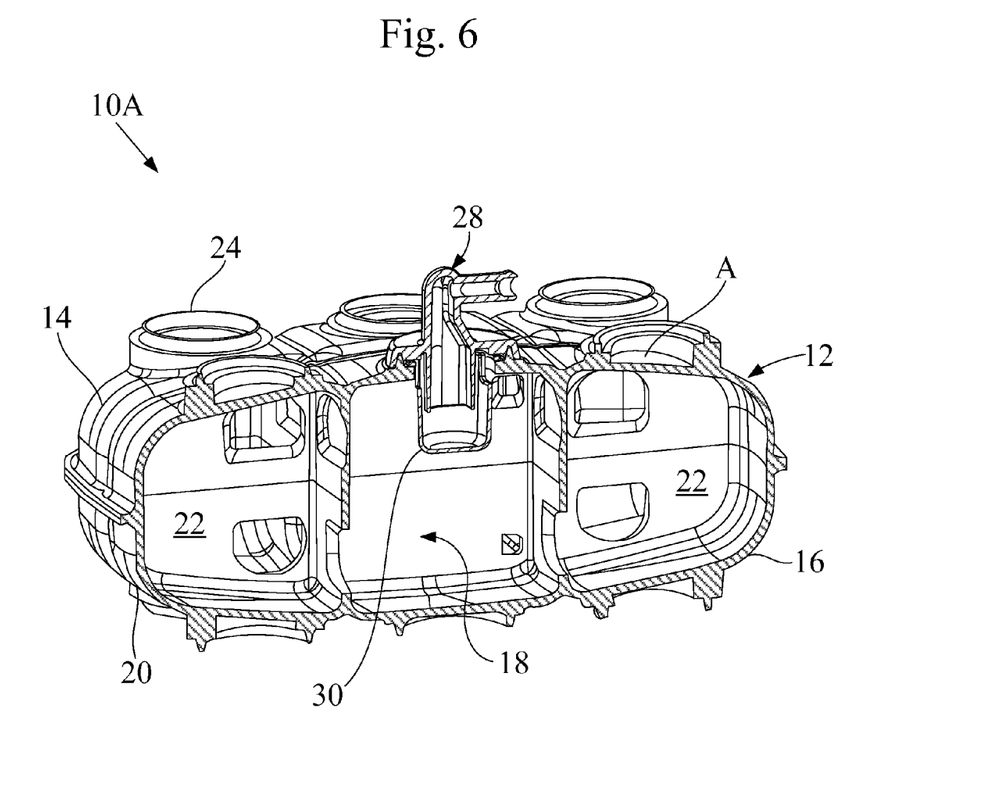
FIG. 6 is a cross-sectional view of another fluid reservoir of the present teachings.
Figure 7:
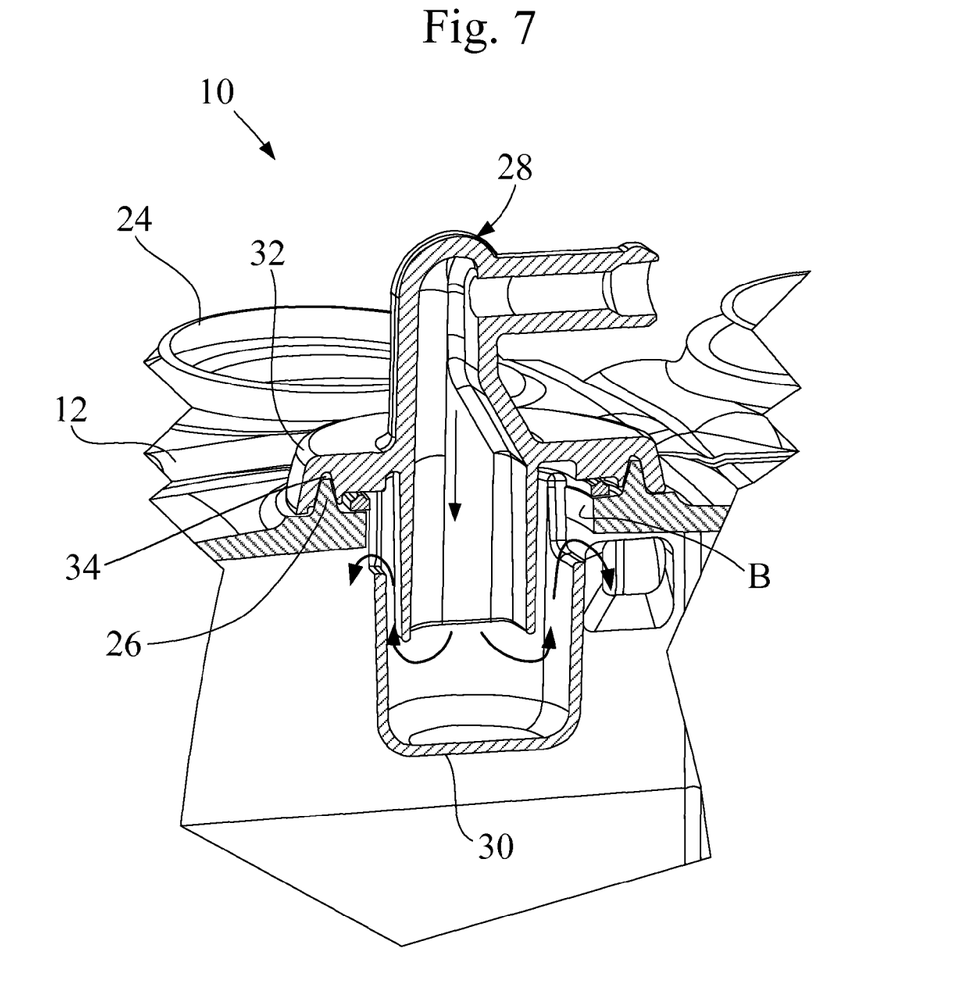
FIG. 7 is an enlarged portion of the fluid reservoir of FIG. 6.

Another fluid reservoir constructed in accordance with the present teachings is illustrated in FIGS. 6 and 7 at reference character 10A. Given the similarities between the fluid reservoirs 10 and 10A, like reference characters will be used to identify similar elements. In this embodiment, the housing elements 14 and 16 are formed to include six (6) sections 20. As illustrated, the sections 20 are arranged in a two-by-three array such that each section 20 is located on a perimeter of the respective housing element 14 or 16. It will be understood that a greater or lesser number of sections 20 may be used within the scope of the present teachings. Similarly, it will be understood that the sides of the fluid reservoir 10 and fluid reservoir 10A need not be defined by sections 20 but may alternatively be a more simplified geometric shape.

As best shown in the cross-sectional view of FIG. 6, the cavity 18 of the housing 12 is broken into various chambers 22 by sidewalls associated with the sections 20. The sidewalls may be external sidewalls or internal, shared sidewalls depending on the position of the particular section 20. The internal sidewalls include openings or passageways such that the various chambers 22 each fluidly communicate with one another. It will be understood that the internal construction of the housing 12 is conventional insofar as the present teachings are concerned.

The housing 12 may carry one or more mounting or attachment portions 24 for selectively receiving fittings. The fittings will be addressed below. As illustrated, the housing 12 includes a plurality of mounting portions 24. A greater or lesser number to that illustrated in the drawings may be incorporated within the scope of the present teachings. It will be understood that to the extent not otherwise described, the mounting portions 24 are substantially identical between the fluid reservoir 10 and the fluid reservoir 10A. As such, common features of the mounting portions 24 may be described herein with reference to both embodiments.

The mounting portions 24 may be integrally formed with the housing elements 14 and 16. For example, the housing 12 may be injection molded to integrally include the mounting portions 24. Alternatively, the mounting portions 24 may be separately formed of similar or distinct material and secured to the housing elements 14 and 16 in any manner well known in the art.

The housing 12 is illustrated throughout the drawings to include a plurality of substantially identical mounting portions 24. Each mounting portion 24 may include an upwardly extending flange 26. The upwardly extending flange 26 may be cylindrical in shape. An area A of the housing 12 circumscribed by each upwardly extending flange 26 may be closed until such time it is desired to selectively attach a fitting thereto. The area A may be a generally circular and planar portion of the housing 12. In this regard, an opening B (see FIG. 7) may be punched or otherwise suitably formed in the housing 12 at one or more of the areas A to cooperate with a fitting.

Throughout the drawings, various fittings are shown selectively attached to the housing 12 at various configurations and in various orientations. One particular fitting is shown in the cross-sectional views of FIGS. 6 and 7 in the form of a nozzle or hose fitting 28. The nozzle 28 is shown operatively associated with a fluid cup 30 for reducing aeration of fluid introduced into the cavity 18. These particular features are described in further detail in commonly assigned U.S. Ser. No. 13/726,173 filed concurrently herewith and entitled Reservoir for Reducing Aeration of a Fluid. This application is incorporated by reference as if fully set forth herein.

The nozzle 28 may be unitarily formed from polypropylene or other suitable material and may generally include a base or mounting portion 32. The mounting portion 24 may be generally circular or disk-shaped. As illustrated in the cross-sectional view of FIG. 7, an underside of the mounting portion 32 may be formed to include a generally circular recess 34. The generally circular recess 34 may be sized to cooperatively receive the upwardly extending flange 26 upon attachment of the nozzle 28 to the housing 12. Alternatively, the housing 12 may include the recess 34 and the mounting portion 24 may include the flange 32. The nozzle 28 may be spin welded or otherwise suitably attached to the housing 12. In this embodiment, the mounting base portion 32 of the nozzle 28 includes the flange 32 thereby defining a mounting surface by which the nozzle 28 is attached to the upwardly extending flange 26 of the housing 12. Upon attachment of the nozzle 28 to the housing 12, the welded interface between the recess 34 and the flange 32 establishes a fluid-tight seal between the housing 12 and the nozzle 28.

In the embodiment of FIGS. 6 and 7, the mounting portions 24 are formed such that the upper surfaces of the flanges 32 and the areas A are oriented generally parallel to a surface of the housing 12 (e.g., either the upper surface or the lower surface of the housing 12). As shown in the embodiment of FIGS. 1-5, the mounting portions 24 provided on the sections 20 on the perimeter of the housing elements 14 and 16 may be oriented at an angle relative to the respective top and bottom surfaces of the housing elements 14 and 16. As such, the mounting surface of the mounting portions 24 may be disposed at an angle relative to first and second adjacent sides of a section 20 of the housing element 14. In this regard, the mounting portions 24 of the housing element 14 may be disposed at the transition between the upper surface and the sidewall. The mounting portions 24 may be oriented at an angle of approximately 45 degrees with respect to two adjacent sides of a section 20.

While substantially similar, the mounting portions 24 of the fluid reservoir 10 are slightly different to cooperate with the associated fittings that will be described below. In this regard, the mounting portions 24 of the fluid reservoir 10 have an upwardly extending flange 32 and a countersunk portion with an inwardly extending circumferential lip 36 (see FIG. 2, for example). As above, the lip 36 circumferentially surrounds an area A that may be removed to selectively create an opening B (see FIG. 7).

Figure 9:
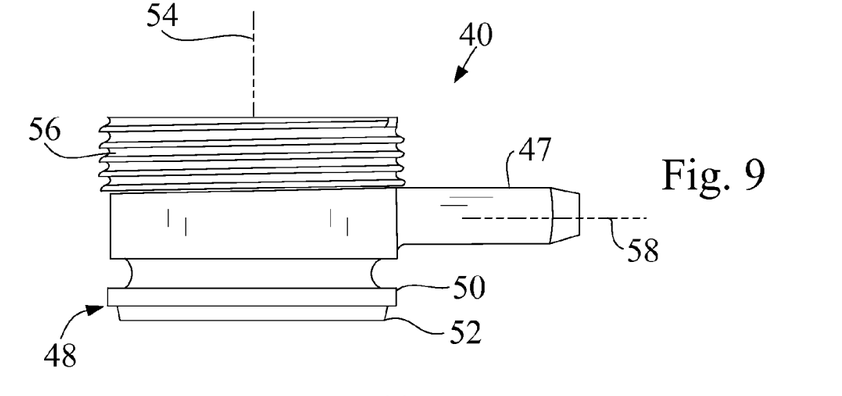
FIG. 9 is a side view of a neck member of FIG. 1.
Figure 10:
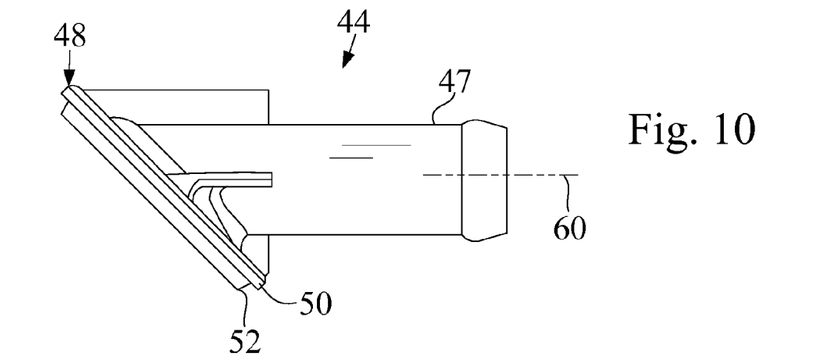
FIG. 10 is a side view of an outlet port of FIG. 1.
Figure 11:
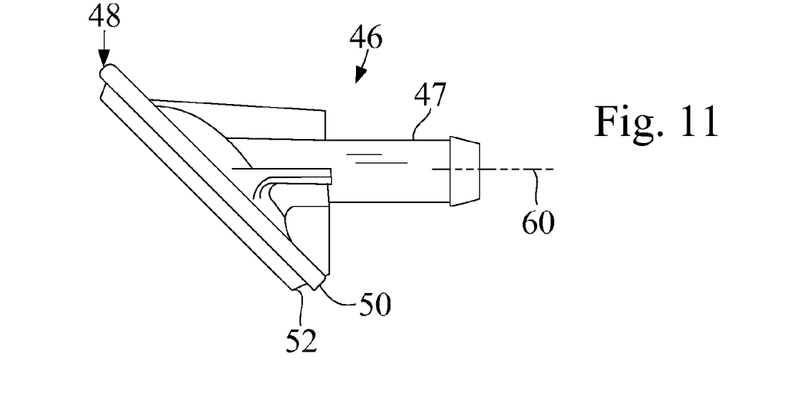
FIG. 11 is a side view of an inlet port of FIG. 1.

The various fittings shown in FIGS. 1-5 are more particularly illustrated in FIGS. 9-11. These fittings include a neck member 40 for a pressure relief cap 42, and hose fittings in the form of an inlet port 44 and an outlet port 46. Each of the fittings 40, 42 and 46 includes a hose connection portion 47 for coupling to a hose in a conventional manner. Each of the fittings 40, 42 and 46 includes a base or mounting portion 48. The base 48 includes a circumferentially extending flange 50 and a downwardly or axially extending circular flange 52. An underside of the flange 50 is sized and shaped to abut the lip 36 of the mounting portion 24. The flange 52 extends into the opening B (see FIG. 7).

With particular reference to FIG. 9, the neck member 40 extends along an axis 54 that is perpendicular to the flange 50. The hose connection portion 47 extends along an axis 58 perpendicular to the axis 54 of the flange 50. Adjacent an upper end, the neck member 40 defines a plurality of threads 56 for threadably engaging the cap 42.

Figure 1:
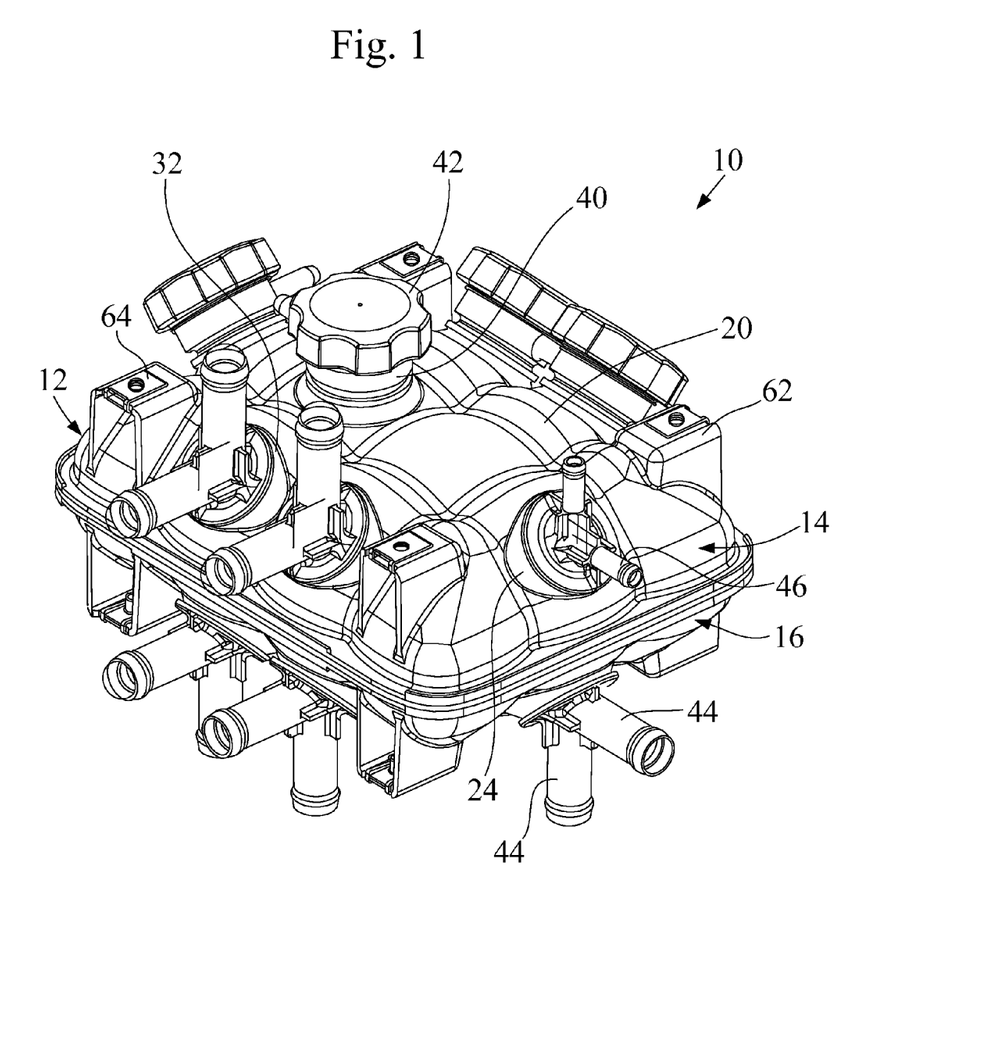
FIG. 1 is a perspective view of a fluid reservoir constructed in accordance with the present teachings, the fluid reservoir shown to include various mounting locations for the different fittings.
Figure 2:
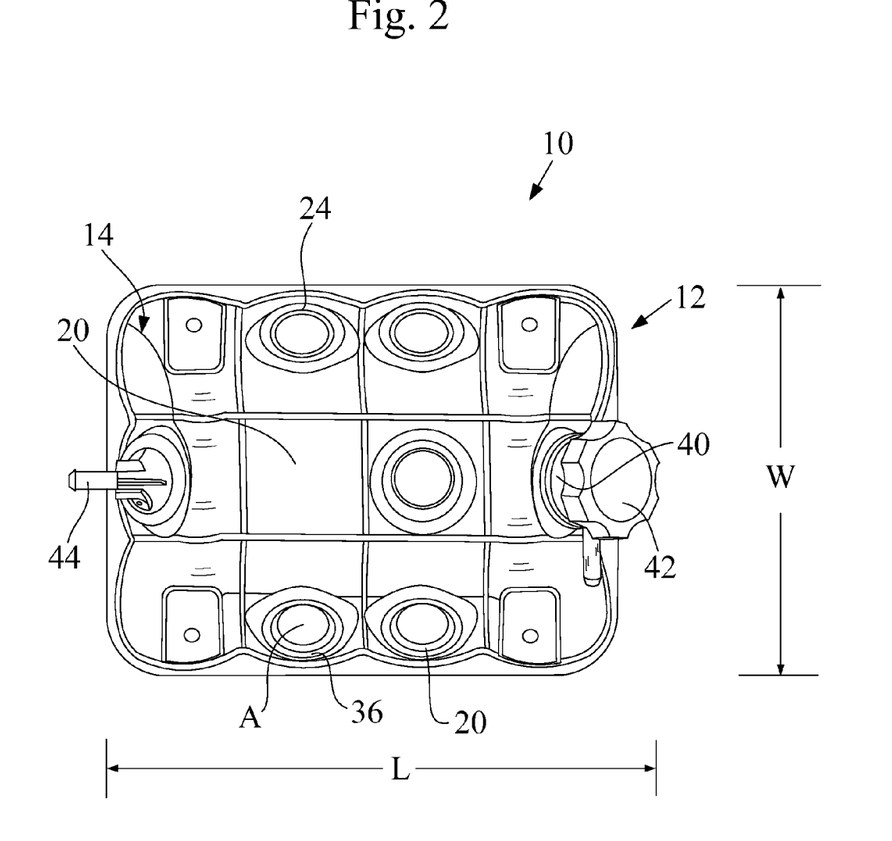
FIG. 2 is a top view of the fluid reservoir of FIG. 1.
Figure 3:
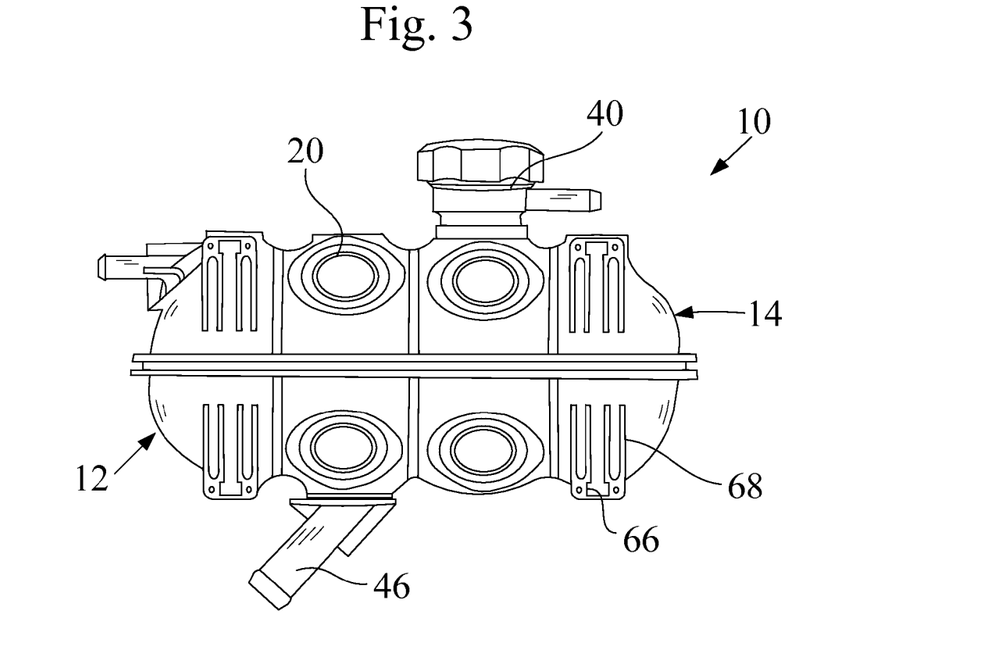
FIG. 3 is a side view of the fluid reservoir of FIG. 1.
Figure 4:
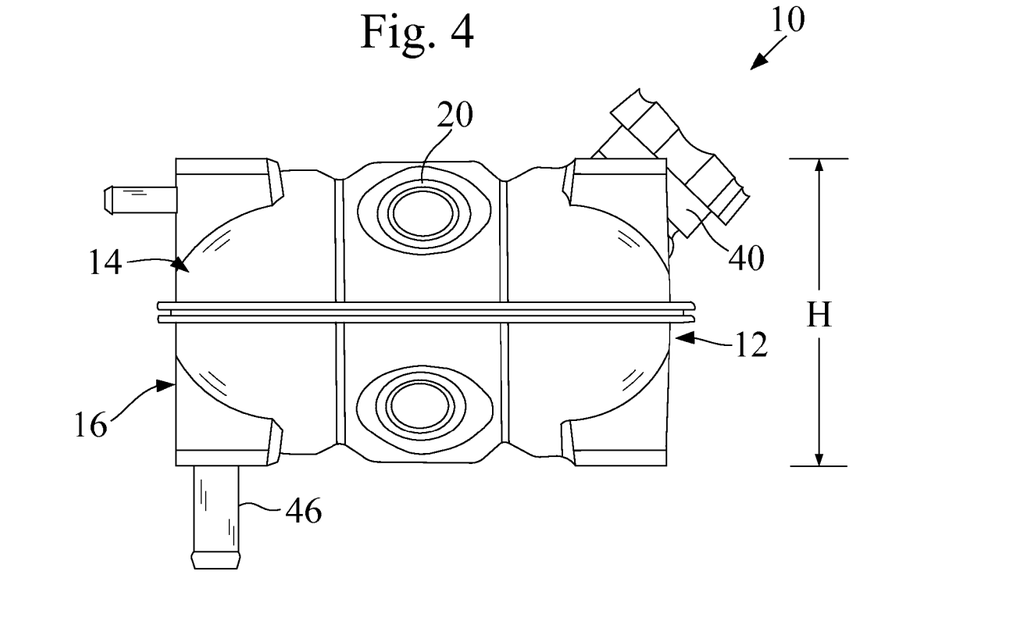
FIG. 4 is an end view of the fluid reservoir of FIG. 1.
Figure 5:
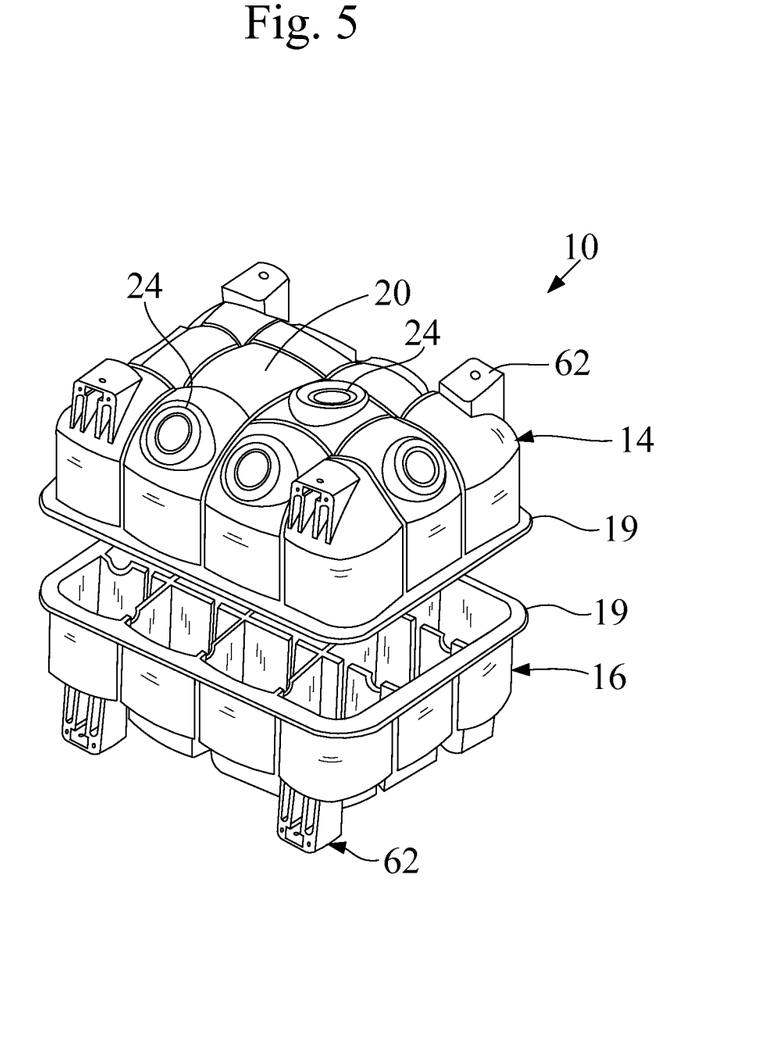
FIG. 5 is an exploded view of the fluid reservoir of FIG. 1.

With particular reference to the perspective view of FIG. 1, the flexibility of the present teachings to accommodate various mounting positions for the different fittings is illustrated. For example, the neck member 40 may be selectively mounted to the mounting portion 24 of one of the sections 20 that does not lie on the perimeter of the housing element 14. Alternatively, the neck member 40 may be selectively mounted to a mounting portion 24 of one of the sections 20 on the perimeter of the housing element 14 (as also shown in FIG. 2). As such, the cap 42 is at an angle to both the upper surface and sidewall. As with the other fittings 44 and 46, the neck member 40 may be selectively mounted to any of the mounting portions 24.

With particular reference to FIGS. 10 and 11, the inlet and outlet ports 44 and 46 both include a hose connection portion 47 that extends along an axis 60 generally askew to the respective flange 50. As illustrated, the axis 60 along which the hose connection portions 47 extend may be at an angle of approximately 45 degrees to the flange 50 (or base 48). This angle, however, may be altered for particular uses within the scope of the present teachings. When the input and output ports 44 and 46 are selectively attached to the housing 12 at mounting portions 24 of sections 20 adjacent the perimeter of the housing element 14, the base 48 may be rotated relative to the upwardly extending flange 32 to achieve a desired orientation of the hose connection portion 47.

The housing 12 is illustrated to include a plurality of attachment portions 62 for mounting the fluid reservoir 10 to a vehicle. As with the mounting portions 24 for the fittings, the attachment portions 62 may be integrally formed with the housing 12. Alternatively, the attachment portions 62 may be separately formed of a similar or distinct material and suitably attached to the housing 12.

The attachment portions 62 will be understood to be similar throughout the various drawings. Each attachment portion 62 is illustrated to define a generally planar surface 64, a slot 66 for receiving a nut 67, and a plurality of ribs 68 interconnecting the generally planar surface 64 and the housing 12. The attachment portions 62 may be located on the sections 20 of the housing elements 14 and 16 at the corners of the housing 12. Further, the attachment portions 62 may be positioned at the transition between the respective upper and lower surfaces and the adjacent sidewall.

The generally planar surface 64 defines a hole 70 through which a threaded fastener 72 extends. The threaded fastener 72 engages the nut 67 disposed in the slot 66. The slot 66 may be defined between the generally planar surface 64 and one or more of the ribs 68.

In one particular application, the fluid reservoir 10 may have a length L of approximately 280 mm, a width W of approximately 215 mm and a height H of approximately 115 mm. In this particular application, the fluid reservoir 10 may have a volume of approximately 3.6 L.

Figure 8:
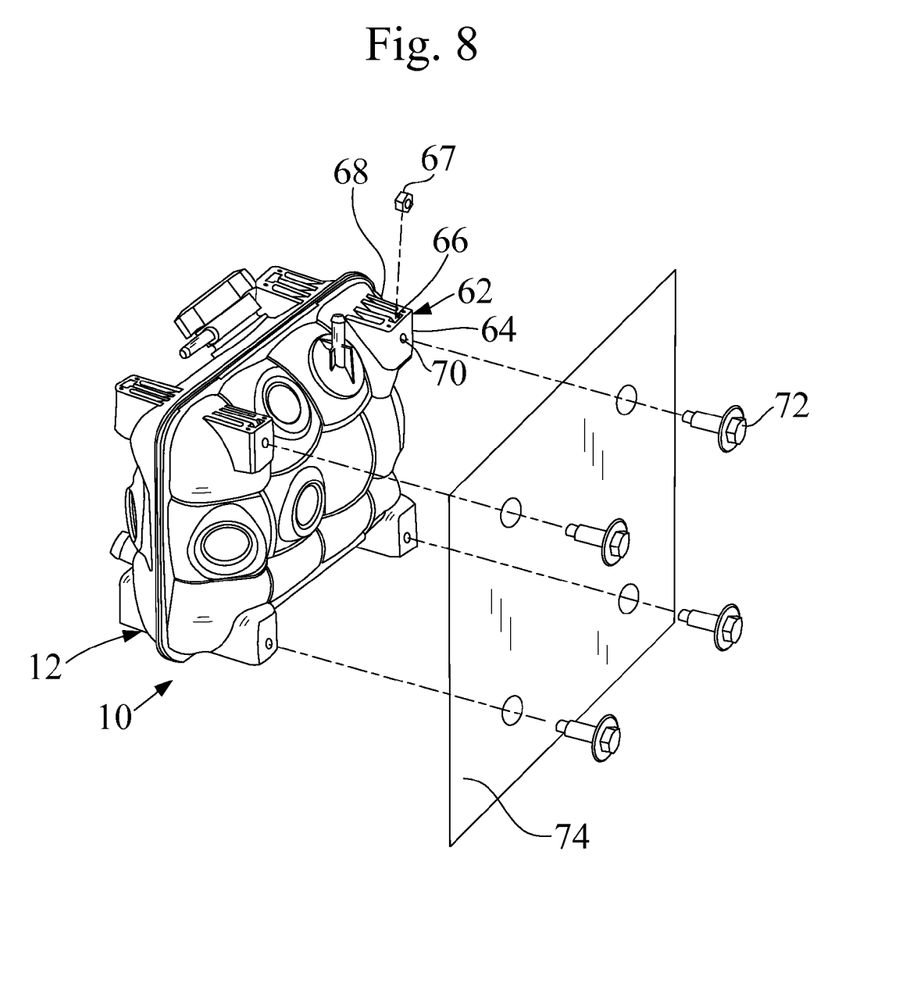
FIG. 8 is a perspective view of the fluid reservoir of FIG. 1, the fluid reservoir shown operatively associated with a mounting plate and mounting hardware.

FIG. 8 illustrates the fluid reservoir 10 operatively associated with a mounting plate 74. The mounting plate 74 may, in turn, be mounted to a vehicle. The mounting plate 74 may abut the planar surfaces 64 of the attachment portions 62. The fasteners 72 may pass through holes 76. The fluid reservoir 10 may be similarly mounted to any surfaces(s) in a vehicle, horizontally, vertically or otherwise.

Figure 12:
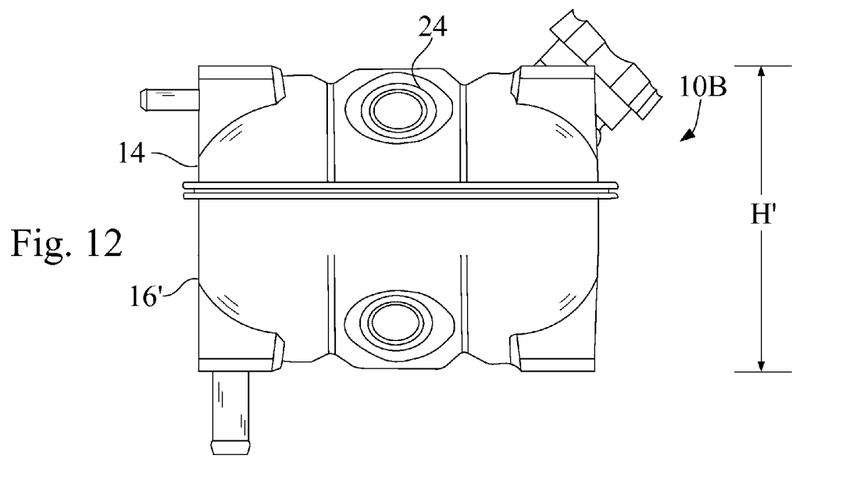
FIG. 12 is an end view similar to FIG. 4 illustrating an alternate construction of the fluid reservoir of FIG. 1, the alternate construction having an increased volume as compared to the fluid reservoir of FIG. 1.

With reference to FIG. 12, an alternate construction of the fluid reservoir 10 is illustrated and generally identified at reference character 10B. The fluid reservoir 10B primarily differs from the fluid reservoir 10 in that it accommodates a greater volume of fluid. Like reference numbers are used to identify similar elements. One of the housing elements 14 of the fluid reservoir 10B may be common with the housing elements 14 and 16 of the fluid reservoir 10B. The fluid reservoir 10B has a second housing element 16' which is similar to the housing element 16 but has an increased height. In the particular embodiment illustrated, the fluid reservoir 10B may have a length L of approximately 280 mm, a width W of approximately 215 mm, a height H' of approximately 168 mm and a volume of approximately 5.8 L.

Figure 13:
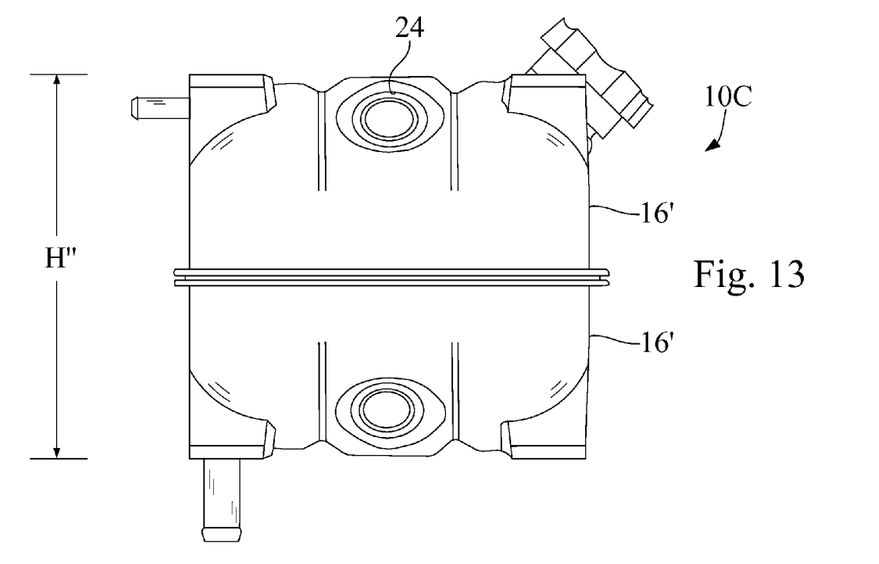
FIG. 13 is an end view similar to FIG. 4 illustrating another alternate construction of the fluid reservoir of FIG. 1, the alternate construction having an even further increased volume as compared to the fluid reservoir of FIG. 1.
Figure 14:
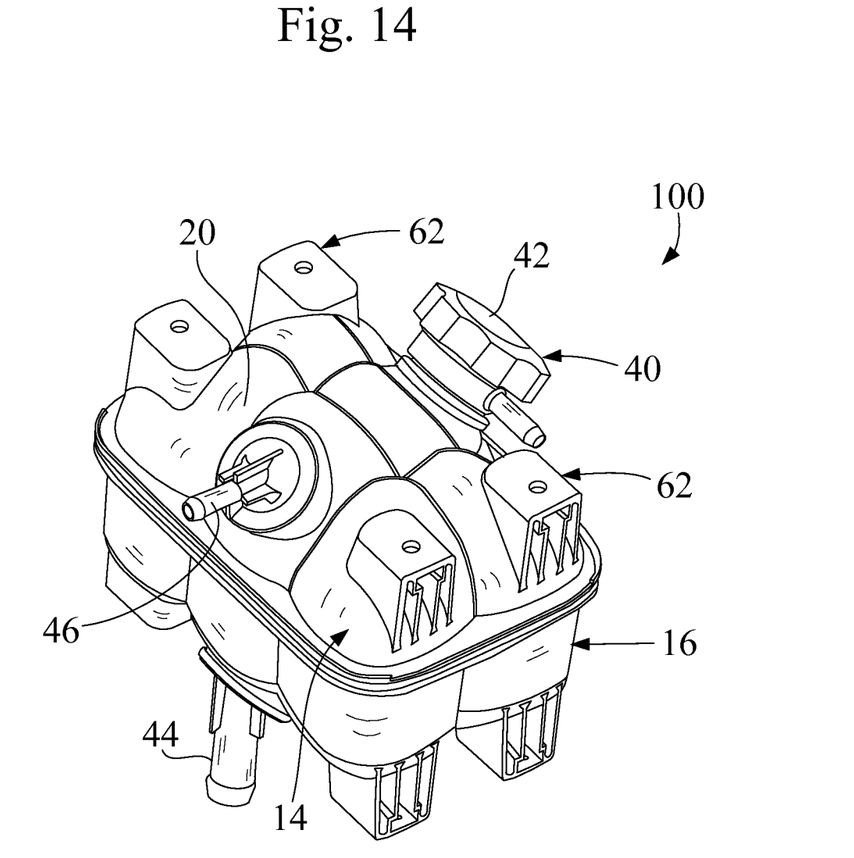
FIG. 14 is a perspective view of another fluid reservoir constructed in accordance with the teachings of the present invention.
Figure 15:
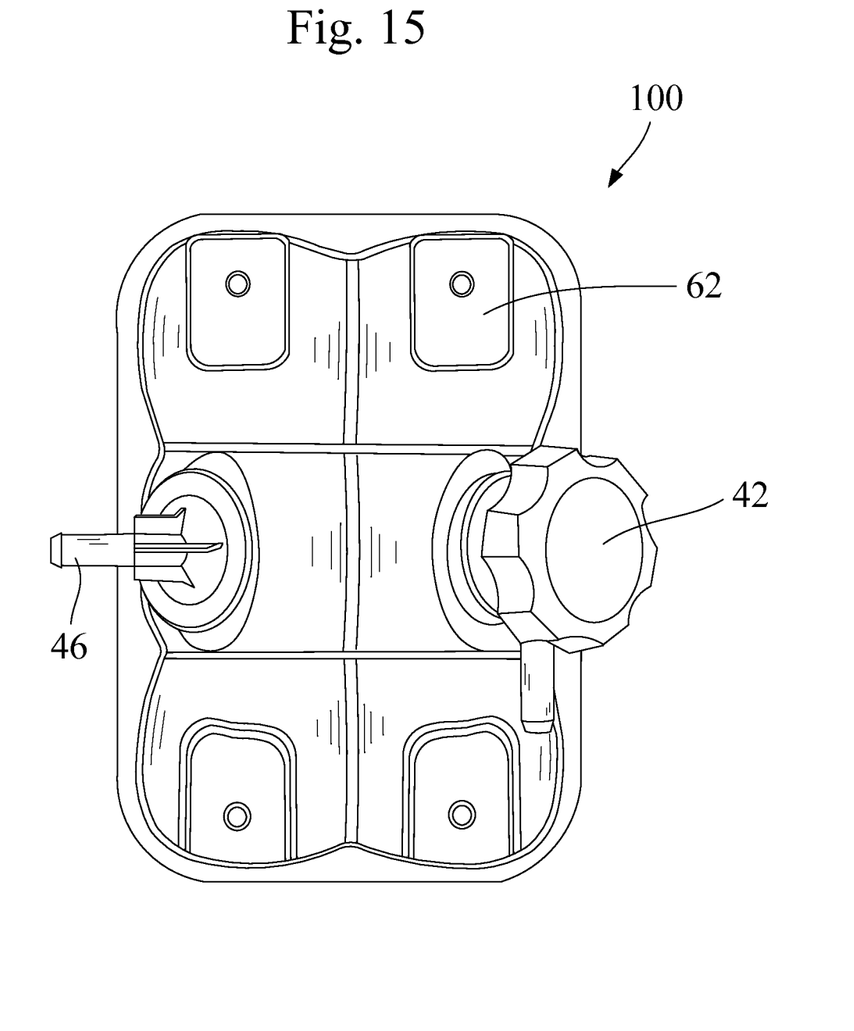
FIG. 15 is a top view of the fluid reservoir of FIG. 14.

With reference to FIG. 13, another alternate construction of the fluid reservoir 10 is illustrated and generally identified at reference character 10C. The fluid reservoir 10C differs from fluid reservoir 10 in that it accommodates an even greater volume of fluid. The housing elements of the fluid reservoir 10C are common with the housing element 16' of the fluid reservoir 10B. In the particular embodiment illustrated, the fluid reservoir 10C may have a length L of approximately 280 mm, a width W of approximately 215 mm, a height H of approximately 220 mm and a volume of approximately 8.0 L.

Turning to FIGS. 14-17, another fluid reservoir constructed in accordance with the present teachings is generally shown and identified at reference character 100. The fluid reservoir 100 differs primarily from the fluid reservoir 10 in that it provides an alternative and smaller footprint. To the extent not otherwise described, the features of the fluid reservoir 100 will be understood to be substantially identical to corresponding features of the fluid reservoir 10. As above, like references are used to identify similar elements.

Figure 16:
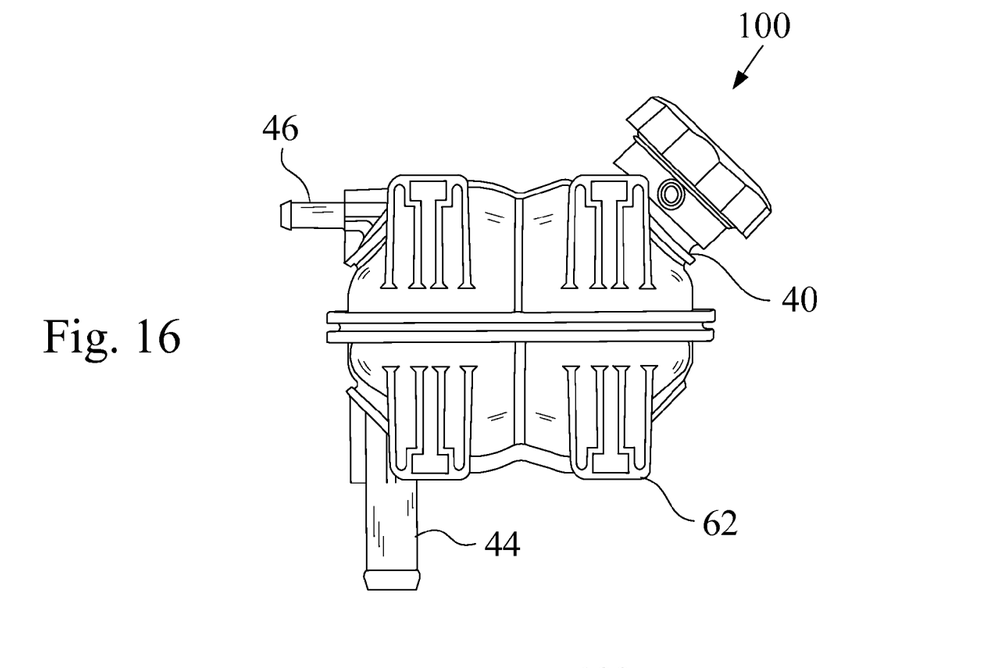
FIG. 16 is an end view of the fluid reservoir of FIG. 14, the fluid reservoir shown in a first mounting orientation.
Figure 17:
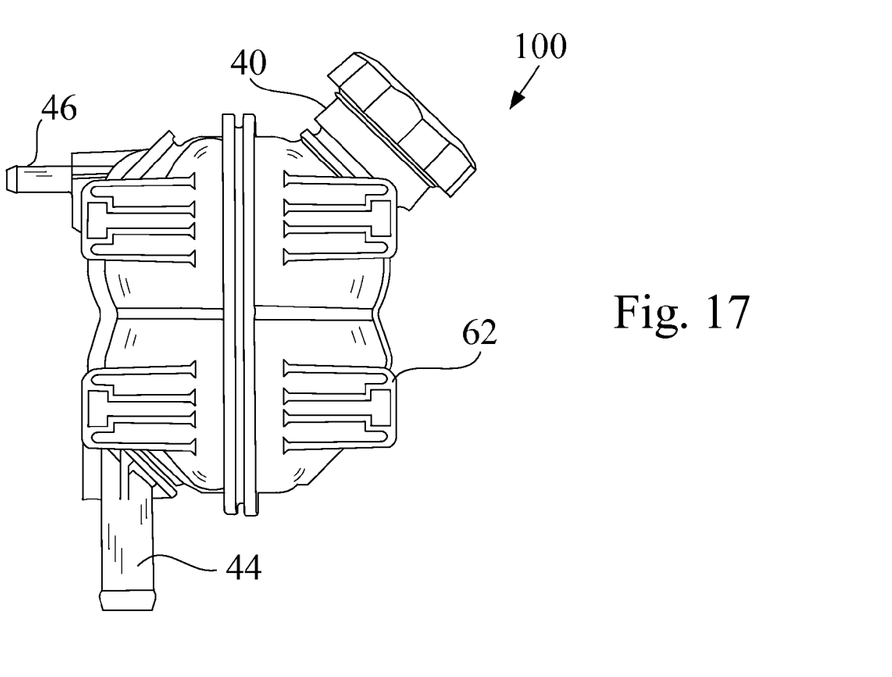
FIG. 17 is another end view of the fluid reservoir of FIG. 14, the fluid reservoir shown in a second mounting orientation.

The housing 12 includes six (6) sections 20 arranged in a two-by-three array. One mounting orientation for the fluid reservoir 100 is shown in FIG. 16. Another mounting orientation is shown in FIG. 17. The fluid reservoir 100 may be mounted, however, in any particular orientation for specific applications.

In the embodiment illustrated, the fluid reservoir 100 may have a length of approximately 215 mm, a width of approximately 150 mm, and a height of approximately 115 mm. In this embodiment, the fluid reservoir 100 may have a capacity of approximately 1.5 L.

From the foregoing it will now be clearly appreciated that the present teachings may provide a collection of parts or a kit that utilizes common components. The common components may be selected to create fluid reservoirs of various configurations, capacities, and footprints. The fluid reservoirs may be each mounted in various orientations and the respective fittings may be selectively attached and oriented on the housings to accommodate particular applications. As a result, tooling costs and other savings may be realized and underhood packaging flexibility may be increased.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fluid reservoir comprising:
a housing defining a chamber for receiving a fluid;
a plurality of mounting portions carried by the housing, the mounting portions are integrally formed with and on the housing; and
at least one fitting, each fitting selectively attached to a respective mounting portion of the plurality of mounting portions;
wherein the plurality of mounting portions are generally circular and the at least one fitting has a generally circular base;
wherein the housing is generally rectangular and includes a plurality of sides forming housing outer walls, the housing outer walls connected to enclose at least one fluid chamber within the housing;
wherein each mounting portion includes:
an upwardly extending annular flange formed on and with one of the housing outer walls, the upwardly extending flange extending outwardly from one of the housing outer walls;
a closed central wall portion circumscribed by the upwardly extending annular flange, the closed central wall portion removed for access to the at least one fluid chamber when the at least one fitting is selectively attached to the upwardly extending annular flange of the respective mounting portion;
wherein the upwardly extending annular flange is receivable into a matching annular recess formed into the generally circular base of a mating one of the at least one fitting.

2. The fluid reservoir of claim 1, wherein
the generally circular base of the at least one fitting has a central axis, the generally circular base being rotatable about the central axis prior to selective attachment of the at least one fitting to the respective one of the mounting portions such that the at least one fitting is rotationally orientable relative to the housing.

3. The fluid reservoir of claim 1, wherein
the plurality of sides is six sides oriented generally orthogonal to one another and further wherein at least one of the mounting portions is oriented at an intersection of first and second adjacent sides of the orthogonally oriented sides.

4. The fluid reservoir of claim 3, wherein
the at least one of the mounting portions defines a mounting surface disposed at an angle relative to both the first and second adjacent sides.

5. The fluid reservoir of claim 1, wherein
the housing includes first and second substantially identical housing elements that cooperate to define the at least one fluid chamber.

6. The fluid reservoir of claim 1, wherein
the at least one fitting is selected from a group consisting of a reservoir neck and a hose fitting.

7. A fluid reservoir comprising:
a generally rectangular housing including six orthogonally oriented sides forming housing outer walls;
a plurality of mounting portions carried by the generally rectangular housing, the mounting portions are integrally formed with and on the housing, at least one of the mounting portions being disposed at an intersection of a pair of adjacent sides of the orthogonally oriented sides such that a mounting surface of the at least one mounting portion is oriented at an angle relative to the pair of adjacent sides; and
at least one fitting, each fitting selectively attached to a respective one of the plurality of mounting portions;
wherein the plurality of mounting portions are generally circular and the at least one fitting has a generally circular base;
wherein the six orthogonally oriented sides form housing outer walls, the housing outer walls connected to enclose at least one fluid chamber within the housing;
wherein each mounting portion includes:
an upwardly extending annular flange formed on and with a respective one of the housing outer walls, the upwardly extending flange extending outwardly from the respective housing outer wall;
a closed central wall portion circumscribed by the upwardly extending annular flange, the closed central wall portion removed for access to the at least one fluid chamber when the at least one fitting is selectively attached to the upwardly extending annular flange of the respective mounting portion;
wherein the upwardly extending annular flange is received into a matching annular recess formed into the generally circular base of a mating one of the at least one fitting.

8. The fluid reservoir of claim 7, wherein
the generally circular base of the at least one fitting has a central axis, the generally circular base being rotatable about the central axis prior to selective attachment of the at least one fitting to the respective one of the mounting portions such that the at least one fitting is rotationally orientable relative to the housing.

9. The fluid reservoir of claim 7, wherein
the housing includes first and second substantially identical housing elements that cooperate to define a chamber for receiving a fluid.

10. The fluid reservoir of claim 7, wherein
the at least one fitting is selected from a group consisting of a reservoir neck and a hose fitting.

11. The fluid reservoir of claim 7, wherein
the mounting surface of the at least one mounting portion is disposed at an angle of approximately 45 degrees to both sides of the pair of adjacent sides.

12. The fluid reservoir of claim 7, wherein
the at least one fitting further includes a hose connection portion, the hose connection portion extending along an axis at an angle to the generally circular base.

13. The fluid reservoir of claim 12, wherein the hose connection portion extends relative to the generally circular base at an angle of approximately 45 degrees.

14. A method of constructing a fluid reservoir, the method comprising:
providing a housing having a plurality of sides forming housing outer walls, the housing outer walls defining a chamber for receiving a fluid within the housing, the housing further defining a plurality of mounting portions integrally formed with and on the housing;
providing at least one fitting for mount onto the housing;
forming an upwardly extending annular flange on each of the plurality of mounting portions, the upwardly extending annular flange formed on and with a respective housing outer wall, the upwardly extending flange extending outwardly from the respective housing outer wall;
wherein the upwardly extending annular flange circumscribes a closed central wall portion, the closed central wall portion removed for access to the fluid chamber when the at least one fitting is selectively attached to the upwardly extending annular flange of the mounting portion;

opening the closed central wall portion of a respective one of the mounting portions;

selectively mating one of the at least one fittings to at least one of the mounting portions;

the upwardly extending annular flange received into a matching annular recess formed into a base of the mating one of the at least one fitting.

15. The method of claim 14, wherein
the housing is generally rectangular with six orthogonally oriented sides, the selectively mating step includes orienting the base at an angle relative to an adjacent pair of the orthogonally oriented sides.

16. The method of claim 15, wherein
in the selectively mating step, the fitting base is oriented at an angle of approximately 45 degrees relative to both of sides of the adjacent pair of orthogonally oriented sides.

17. The method of claim 14, wherein
the at least one fitting includes a hose connection portion oriented at an angle relative to the fitting base, and further wherein the selectively mating step includes orienting the hose connection portion generally parallel to a side of the housing.

18. A kit for constructing a fluid reservoir, the kit comprising:

a plurality of housing elements, each housing element cooperating with another housing element to define a generally rectangular housing including six orthogonally oriented sides;

a plurality of mounting portions carried by each housing element of the plurality of housing elements, the mounting portions integrally formed with and on the housing element;

wherein at least one of the mounting portions is disposed at an intersection of a pair of adjacent sides of the orthogonally oriented sides when two of the housing elements are joined to define the generally rectangular housing; and at least one fitting, each fitting selectively attached to a respective one of the plurality of mounting portions;

wherein the plurality of mounting portions are generally circular and the at least one fitting has a generally circular base;

wherein the housing is generally rectangular and the six orthogonally oriented sides form housing outer walls, the housing outer walls connected to enclose at least one fluid chamber within the housing;

wherein each mounting portion includes:

an upwardly extending annular flange formed on and with one of the housing outer walls, the upwardly extending flange extending outwardly from the housing outer wall;

a closed central wall portion circumscribed by the upwardly extending annular flange, the closed central wall portion removed for access to the at least one fluid chamber when the at least one fitting is selectively attached to the upwardly extending annular flange of the mounting portion;

wherein the upwardly extending annular flange is receivable into a matching annular recess formed into the generally circular base of a mating one of the at least one fitting.

* * * * *